United States Patent [19]
Broersma

[11] Patent Number: 5,119,516
[45] Date of Patent: * Jun. 9, 1992

[54] REINFORCED EXPANDED PLASTIC HELMET CONSTRUCTION

[75] Inventor: Lester V. Broersma, Bellflower, Calif.

[73] Assignee: Bell Sports, Inc., Norwalk, Calif.

[ * ] Notice: The portion of the term of this patent subsequent to Feb. 27, 2007 has been disclaimed.

[21] Appl. No.: 424,646

[22] Filed: Oct. 25, 1989

Related U.S. Application Data

[63] Continuation-in-part of Ser. No. 273,827, Nov. 21, 1988, abandoned, which is a continuation-in-part of Ser. No. 248,616, Sep. 26, 1988, Pat. No. 4,903,348.

[51] Int. Cl.⁵ .............................................. A42B 3/04
[52] U.S. Cl. ................................... 2/411; 2/412; 2/421; 2/425
[58] Field of Search ............... 2/183, 410, 411, 412, 2/414, 417, 418, 419, 420, 421, 425, DIG. 6; 264/46.7, 255, 275; 425/4 R, 125

[56] References Cited

U.S. PATENT DOCUMENTS

| | | | |
|---|---|---|---|
| 1,522,024 | 1/1925 | Nixon, Jr. | 2/421 |
| 1,875,143 | 8/1932 | Punton | 2/412 |
| 2,115,065 | 4/1938 | Dym | 2/412 |
| 2,123,275 | 7/1938 | Dym | 2/412 |
| 2,679,046 | 5/1954 | Dye | 2/421 X |
| 2,926,356 | 3/1960 | Taylor | 2/6 |
| 3,082,485 | 3/1963 | Thomas | 264/255 |
| 3,262,125 | 7/1966 | Bowen | 2/412 |
| 3,283,349 | 11/1966 | Waite | 2/421 X |
| 3,425,061 | 2/1969 | Webb | 2/414 |
| 3,467,964 | 9/1969 | Hannan | 2/410 |
| 3,529,306 | 9/1970 | Thorne | 2/411 |
| 3,582,990 | 6/1971 | Frieder | 2/412 X |
| 4,068,323 | 1/1978 | Gwon | 2/413 |
| 4,300,242 | 11/1981 | Nava et al. | 2/412 |
| 4,449,275 | 5/1984 | Nava | 24/458 |
| 4,464,799 | 8/1984 | Nava | 2/421 |
| 4,466,138 | 8/1984 | Gessalin | 2/243 R |
| 4,766,616 | 8/1988 | Donahue | 2/422 |

FOREIGN PATENT DOCUMENTS

| | | | |
|---|---|---|---|
| 42782 | 12/1981 | European Pat. Off. | |
| 96148 | 12/1983 | European Pat. Off. | 2/411 |
| 096763 | 12/1983 | European Pat. Off. | |
| 280042 | 8/1988 | European Pat. Off. | 2/417 |
| 800502 | 11/1950 | Fed. Rep. of Germany . | |
| 3235948 | 4/1983 | Fed. Rep. of Germany . | |
| 3632525 | 3/1988 | Fed. Rep. of Germany . | |
| 2241267 | 3/1975 | France | 2/410 |
| 2108571 | 8/1985 | United Kingdom . | |
| 8901744 | 3/1989 | World Int. Prop. O. . | |

Primary Examiner—Andrew M. Falik
Assistant Examiner—Michael A. Neas
Attorney, Agent, or Firm—William W. Haefliger

[57] ABSTRACT

A helmet has a generally dome shaped helmet body with inner and outer sides and a lower edge extending generally in the shape of a loop; an elongated reinforcement member is embedded in the helmet to extend proximate the looping lower edge portion; that member may have band shape; and additional such band shaped reinforcement members may extend within the dome shape of the helmet, such as laterally spaced rib or ridge portions.

23 Claims, 11 Drawing Sheets

REINFORCED EXPANDED PLASTIC HELMET CONSTRUCTION

BACKGROUND OF THE INVENTION

This application is a continuation-in-part of Ser. No. 273,827 filed Nov. 21, 1988, now abandoned, which is a continuation-in-part of Ser. No. 248,616 filed Sept. 26, 1988 now U.S. Pat. No. 4,903,248. This invention relates generally to reinforced helmets, and more particularly, to a plastic molded helmet reinforced against fracture due to impact, as while retained to a wearer's head.

There is need for an improved plastic helmet, reinforced in a simple manner to prevent helmet fracturing, and so as not to interfere with normal molding or with helmet retention to the wearer's head. This need becomes more important in plastic helmets which contain multiple through openings (air vents and strap openings) which may reduce somewhat the helmet body resistance to cracking under high impact loads.

SUMMARY OF THE INVENTION

It is a major object of the invention to provide an improved helmet, such as a bicycle helmet, which comprises, basically:

a) a helmet body consisting of gas expanded synthetic resin, and having dome shape defining a lower edge extending generally in a loop, b) an elongated reinforcement member embedded in the helmet body to extend above the lower edge.

Typically, the reinforcement member consists of high strength synthetic resin, such as NYLON, and has band shape, the member oriented to have a lower edge projecting toward the helmet lower edge. Also, the reinforcement member may be curved to project with dome shape matching that of the helmet body to reinforce the top end of the helmet.

It is an additional object to provide locater means projecting to the member to locate it within the helmet body, in concealed condition, at the time of molding. A vent opening or openings may extend through the helmet body wall, and the reinforcement member may project edgewise slightly into that opening, to reinforce the opening defining edge structure of the body.

It is another object of the invention to provide openings through the body to pass retention straps; and in this environment, a first strap holder is configured to be supported at and by the outer side of the helmet, the holder attached to at least one strap that extends through one of the openings, and the holder operable to transmit strap tension to the helmet. The reinforcement member is spaced from such openings.

It is yet another object to provide the holder in the form of a solid band received in a reentrant recess at the top of the helmet, above the reinforcement member, having loop shape, and, the band and recess may very advantageously have arch shape, crosswise of the helmet outer side. The helmet may also define a notch proximate a side of the recess for finger reception to lift the holder from the recess, the holder being releasably retained in the recess; and attachment means may be provided to positively attach the holder to the helmet at its outer side, the helmet body typically consisting of expanded polystyrene.

It is a further object of the invention to provide a second strap holder configured to be supported at and by the outer side of the helmet, the holder attached to at least one strap that extends through one of the openings, and the holder operable to transmit strap tension to the helmet. The holders typically consist of solid material and have adjustable connections to the straps, the holders releasably attached to the helmet body to be lifted for effecting strap adjustment, and to be reattached to the body. Also, the holders may be integrated.

An additional object is to provide a fabric cover fitting over the body and holder and retained to the body proximate the lower edge thereof.

It is a further object to provide an elongated reinforcement member embedded in a helmet body having forwardly and rearwardly extending ridge or rib portions, which are sidewardly spaced apart, the reinforcement member including a looping section embedded in the helmet body lowermost extent, and at least one additional section which is arch shaped and which extends into and laterally through the ridge or rib portions to resist deflection of the latter.

These and other objects and advantages of the invention, as well as the details of an illustrative embodiment, will be more fully understood from the following specification and drawings, in which:

DETAILED DESCRIPTION

Figure 1:
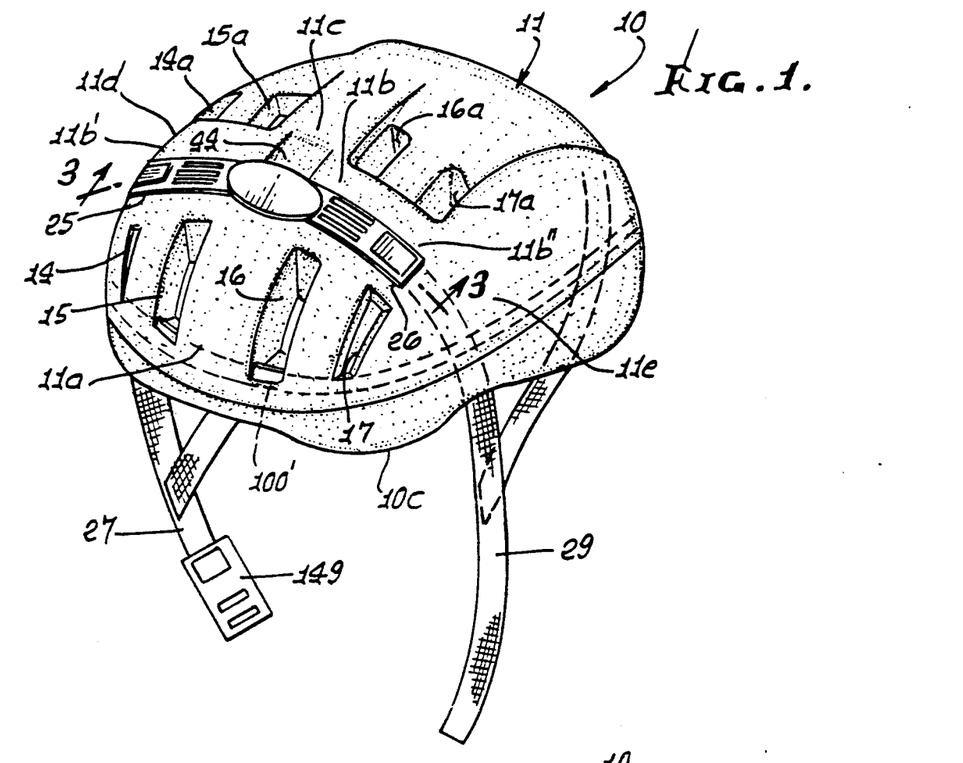
FIG. 1 is a frontal perspective view showing a reinforced helmet incorporating the invention.
Figure 2:
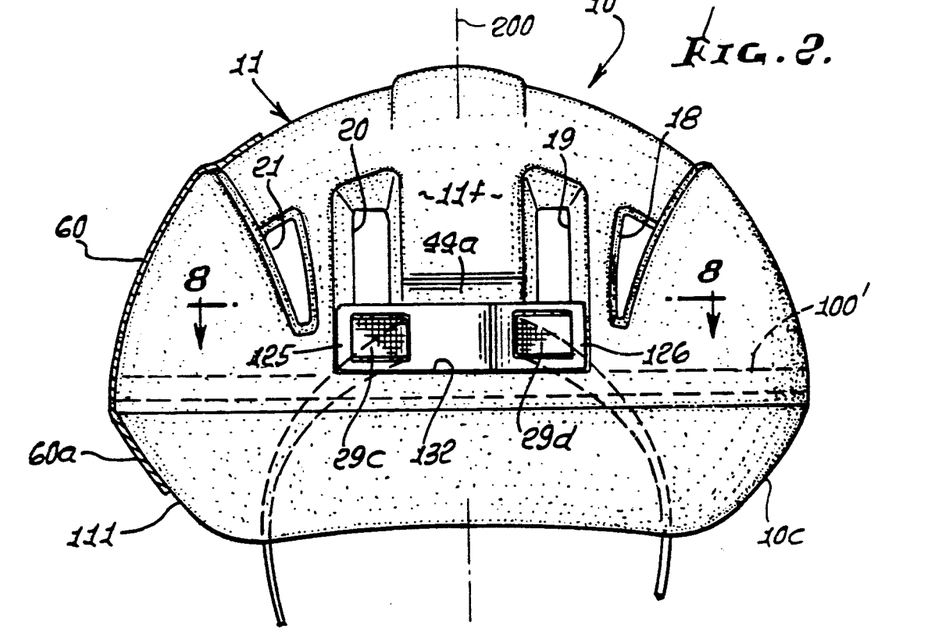
FIG. 2 is a rear elevation of the FIG. 1 helmet.

In the drawings, the bicycle helmet 10 includes a generally dome shaped, foamed plastic body 11 having inner and outer surfaces or sides 12 and 13. Body 11 may consist of air expanded polystyrene. The manner in which a helmet body can be molded from polystyrene and like materials is known, generally, and does not without more constituted part of this invention. An exemplary process for molding a helmet body is disclosed in U.S. Pat. No. 4,300,242. In accordance with the invention, any known method could be employed for molding the helmet body from polystyrene or a like material. The body front 11a contains or defines four generally vertical openings 14-17 which are laterally spaced apart. Four rearward continuations 14a-17a of those openings are defined by an upper portion 11c of the body, forward of an upright plane that extend laterally and bisects the helmet into forward and rearward portions. Body portion 11b between the body portions 11a and 11c is uninterrupted by the air inlet openings, and extends laterally between regions 11d and 11e. The body rear extent 11f contains or defines four generally vertical openings 18-21 which are laterally spaced apart. Openings 15 and 16 extend through the shell-like body to constitute air inlet openings; and likewise, openings 19 and 20 extend through the body to constitute air discharge openings. Air flow passage 22 formed or sunk in the interior surface 12 guides or passes ventilation air from opening 15 to opening 19; and passage 23 also formed or sunk in surface 12 guides or passes air from opening 16 to opening 20. Openings 14, 17, 18, 21, and 14a-17a may constitute recesses simulating air passing openings. Openings 14a-17a typically extend through the body, i.e., to intersect inner side 12.

In this environment, an elongated reinforcement member 100', having band shape, is embedded in the helmet body to extend above the helmet lower edge 10c. The helmet body is molded about the band, which is typically metallic (for example steel). Thus, the band is of a different material than the helmet body. The band extends in a loop to provide hoop tension, under certain input loading conditions imposed on the helmet; for example, lateral spreading apart of the helmet at its lower edge portion is then prevented, to prevent helmet cracking, as adjacent openings through the helmet body. The upper edge of the band typically extends within the lowermost extents of the openings 19 and 20 to assure that the plastic body forming the openings is reinforced.

In one type helmet, which may be advantageously reinforced, a first strap holder, as at 25, is configured to be supported at and by the outer side of the helmet, as for example body portion 11b'; and likewise, a second strap holder, as at 26, is configured to be supported at and by the outer side of the helmet, as for example at body portion 11b''. The body 11b includes 11b' at the right front, and portion 11b'' at the left front, i.e., at opposite sides of a vertical plane 200 that extends front to rear and bisects the helmet. Holders 25 and 26 may be integral with one another to define a single holder which is arch shaped as is clear from FIG. 3; or they may be separate from one another, i.e., separately liftable from the helmet body, to allow strap adjustment.

Figure 3:
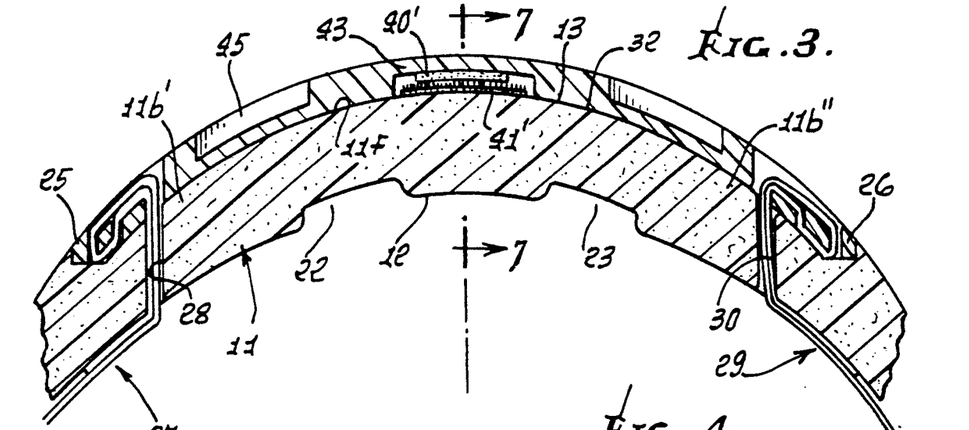
FIG. 3 is an enlarged section taken on lines 3—3 of FIG. 1.

Holder 25 is attached to a strap 27 that extends downwardly through a strap opening 28 in body 11, i.e., in body portion 11b'; and holder 26 is attached to a strap 29 that extends downwardly through a strap opening 30 in body 11, i.e., body portion 11b''. Each holder 25 and 26 operates to transmit strap tension to the helmet body; thus, the holders, being arch shaped, fit the arch shaped lateral upper surface 11f of the helmet, as for example at the bottom of a lateral groove 32 sunk downwardly in the body portion 11b, whereby the upper surfaces of the holders 25 and 26 are substantially flush with the main outer or upper surface of the helmet. Groove 32 extends across the body 11, as shown, above the level of the reinforcement member 100, as to openings 28 and 30.

Figure 4:
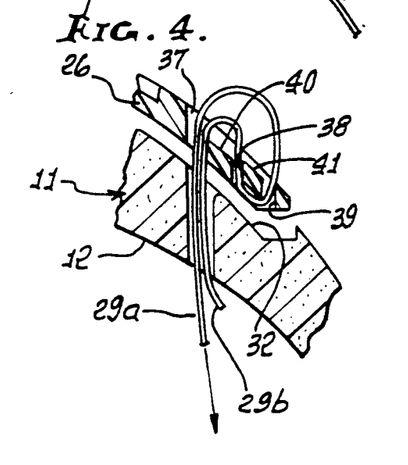
FIG. 4 is a fragmentary section of a portion of FIG. 3 showing a loosened strap.
Figure 5:
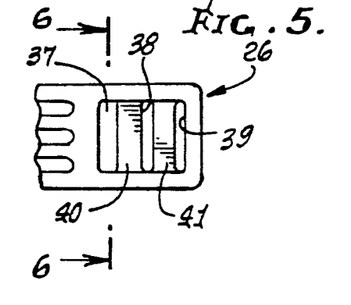
FIG. 5 is a partial plan view of a web lock.
Figure 6:
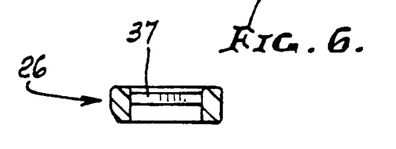
FIG. 6 is a section on lines 6—6 of FIG. 5.
Figure 7:
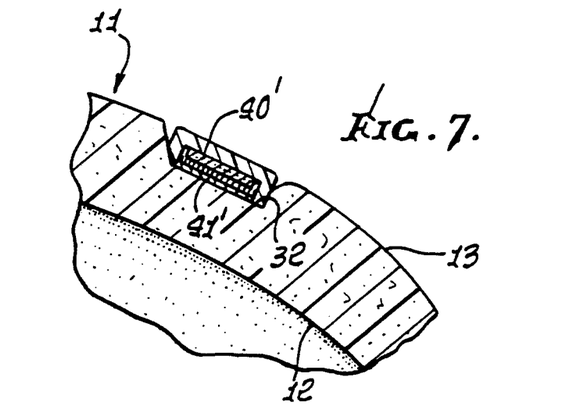
FIG. 7 is a vertical section taken on lines 7—7 of FIG. 3.

The holder or holders 25 and 26 are liftable upwardly away from the helmet body, i.e., out of the groove 32, to allow strap adjustment, i.e., lengthening or shortening. In this regard, each holder defines slot means, through which its associated strap passes for adjustment retention. Accordingly, each strap is adjusted at a location at the top of the helmet, away from the face of the wearer, obviating need for any adjustment brackets or slots in plates next to the wearer's face, which can irritate or disturb or distract the helmet wearer. As seen for example in FIGS. 3-5, band-like holder 26 defining through slots 37-39, and cross-pieces 40 and 41 extending crosswise of the slots, whereby strap lengths 29a and 29b extend upwardly through slot 37, then laterally over cross-piece 40, and then loop downwardly about cross-piece 39. This allows relative sliding adjustment of the strap sections or lengths 29a and 29b to lengthen or shorten strap length 29a that extends downward uninterruptedly adjacent the wearer's face; and this sliding adjustment is typically carried out while the holder is elevated relative to the body 11. See FIG. 4.

After completion of strap length adjustment, the arch-shaped holders 25 and 26 are lowered into position as seen in FIG. 3, in groove 32, and held therein. For example, a VELCRO (hook and pile) connection may be provided to releasably retain the hands or holders 25 and 26 in down position. See VELCRO sections 40' and 41' in FIGS. 3 and 37, section 40' carried by the body 11 at the bottom of the groove 32, and section 41' carried by the underside of the holder mid portion 43. The latter is between holders 25 and 26 and integral therewith, for example, providing one unit band.

The holders 25 and 26 may be forcibly lifted upwardly by exerting upward prying force to free the two hook and pile sections. In this regard, FIG. 1 shows a notch 44 proximate a side of the re-entrant recess 32 for fingers reception to lift the holder unit 25 and 26, and its upward arching mid portion 43, to allow strap adjustment above the helmet and body, as described. The holder unit may also contain lengthwise re TM entrant slots 45, as shown.

Figures 9, 9A, 10:
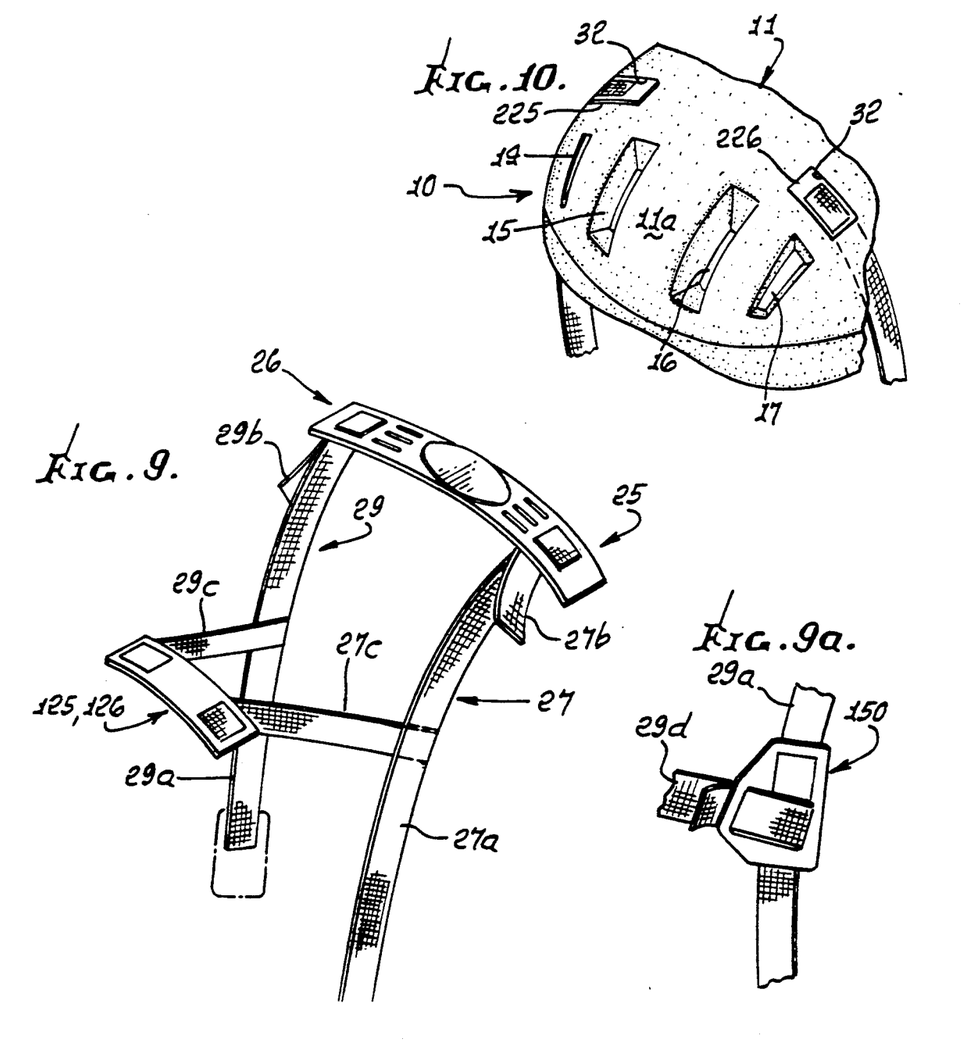
FIG. 9 is a perspective view of a strap harness as used in the FIG. 1 helmet.
FIG. 9a shows an alternate harness connection.
FIG. 10 is a modification that depicts a fragmentary rear perspective view of a helmet having a two piece web lock.

FIG. 10 shows a modified helmet construction wherein the holders 125 and 126 are not connected by a mid-portion 43, but are separated, for downward reception in local recesses 32, at opposite sides of the helmet. Thus, each holder 25 and 26 in FIG. 10 is individually liftable from its recess 32, for strap adjustment, and locking when returned to recesses 32.

Figure 8:
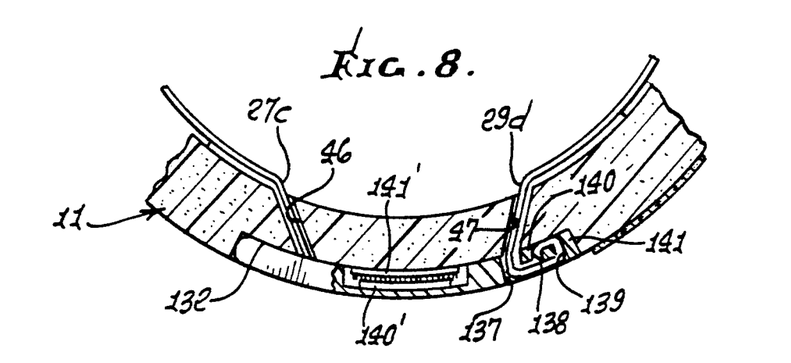
FIG. 8 is a horizontal section taken on lines 8—8 of FIG. 2.

FIG. 9 shows a complete strap harness with holders 25 and 26. The harness also includes strap sections 29c and 27c, having their forward ends respectively attached to sections 29a, as shown. Rearward ends of the sections 29c and 27a and 29d pass through rearward openings 46 and 47 in the body 11 (see FIG. 8), and adjustably attach to holders 125 and 126 of an arch shaped rearward holder unit. The latter is received in a re-entrant rearward recess 132 in the body 11, and releasably retain therein as by VELCRO connection sections 140' and 141'. Thus, the holders 125 and 126 may be rearwardly separated from the body 11 to allow length adjustment of strap sections 29c and 29d. The latter have looping adjustable connection with holder cross-pieces 140 and 141, similar to cross-pieces 40 and 41. See associated slots 137–139 corresponding to slots 37–39. A tapered notch 44a is adapted to receive the wearer's finger to release (lift) the holder unit.

A net-like, flexible and stretchable cover 60 may be fitted over the helmet to cover the holders and strap extents at the top of rear of the helmet, as seen in FIG. 2, the cover may have its lower edge portion 60a extending downwardly and inwardly along correspondingly slanted side wall extent 111 of the body 11 for retaining the cove in position.

FIG. 1 shows a buckle 149 to connect straps 27 and 29. In FIG. 9a, a clip 150, such as a plastic plate, is carried by the strap 29a, and the strap 29d attached to the clip, as shown.

Holders 125 and 126 may comprise a one-piece unit.

Figure 11:
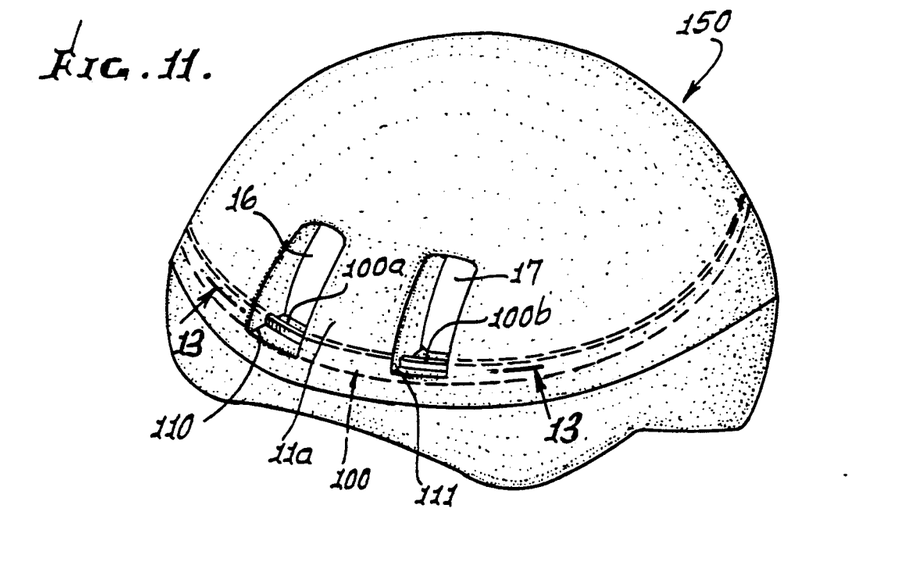
FIG. 11 is a view like FIG. 1 showing a modified helmet, reinforced in accordance with the invention.
Figure 12:
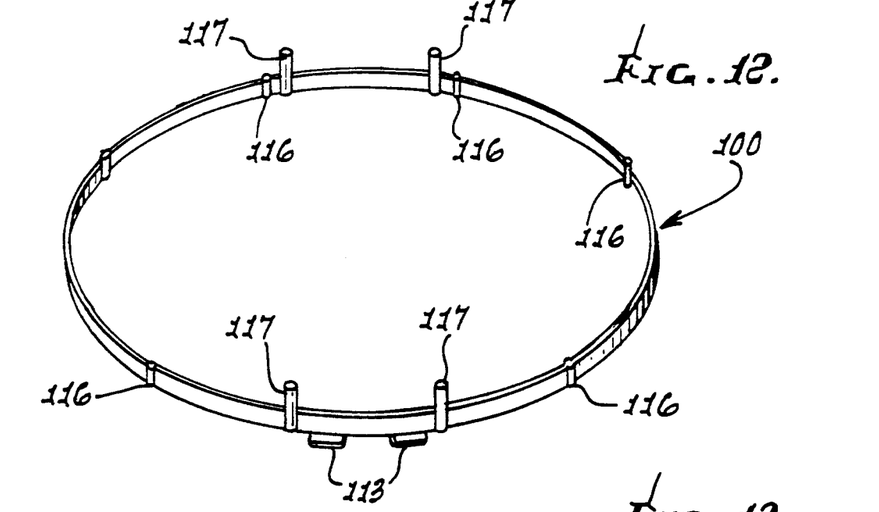
FIG. 12 is a perspective view showing a reinforcing band.

In FIG. 11, the helmet, 150 is in many respects like that of FIGS. 1 & 2, and so bears the same numbers for the corresponding elements. The reinforcement member or band 100 is embedded encapsulated in the molded and gas expanded synthetic resin (polystyrene, for example) of the helmet body 111, closer to the helmet lower looping edge 10c than to the dome shaped top crown. FIG. 12 shows the looping band 100, which may be metallic. Note that the band is embedded in such manner that it is spaced inwardly from the inner and outer sides of the body, yet it projects upwardly at 100a and 100b into the lowermost extents of the two through openings 16 and 17 in the helmet front wall 11a, thereby to strengthen the plastic material that forms these openings, as at their sharp corner angles indicated at 110 and 111, where cracks could develop under impact stress, as during a bicycle rider's helmet impact with the ground or with a automobile.

Figure 13:
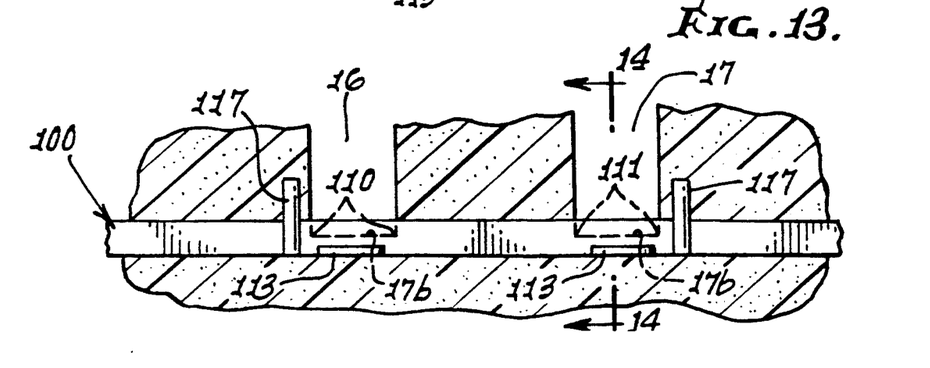
FIG. 13 is an enlarged fragmentary section taken on lines 13—13 of FIG. 11.
Figure 14:
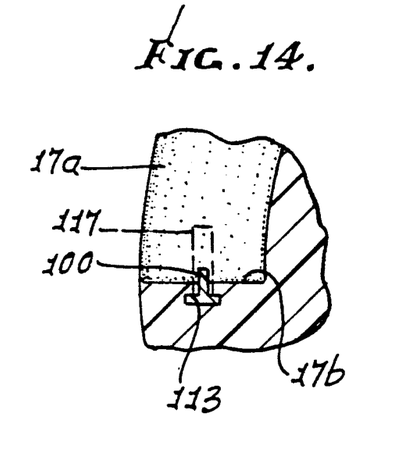
FIG. 14 is a section on lines 14—14 of FIG. 13.

Locater means is provided integrally on the thin band 100 to project in such manner as to locate a portion of the band in the body of the helmet at the time of molding thereof. See in this regard flanges 113 that seat on the surfaces 114a of the mold bosses 114; the enlargements 117 that bear against the sides 114b and 115b of the bosses; and posts 116 that project above the level of the band, as seen in FIG. 13, adjacent the vent openings 16 and 17, to reinforce the plastic material of the body. The mold base itself is indicated at 118, in FIGS. 15 and 16, and the mold cover at 119 in FIG. 16. The band 100 is received downwardly in slots 120 in bosses 114, seen in FIG. 16. FIG. 14 shows the side wall 17a of opening 17, and the band 100 projecting above the bottom wall 17b of the opening 17.

Figure 15:
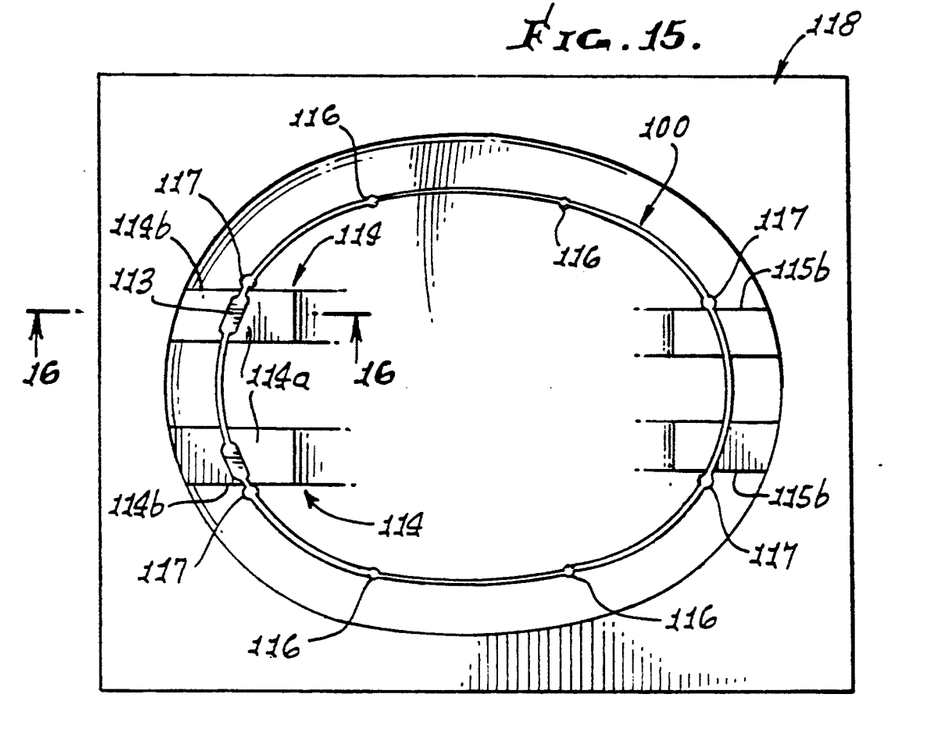
FIG. 15 is a plan view showing support of the reinforcement member in a mold, as during molding.
Figure 16:
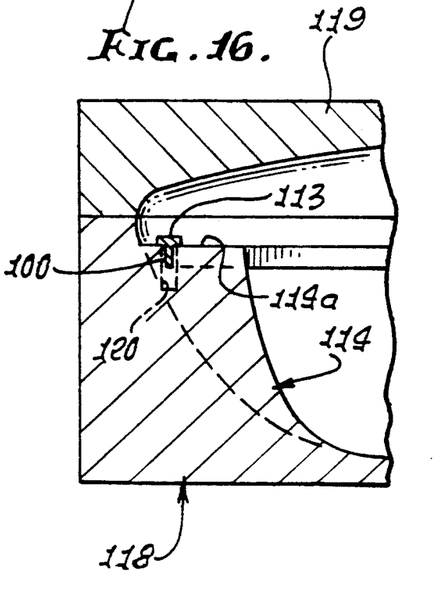
FIG. 16 is an enlarged section taken on lines 16—16 of FIG. 15.

During installation of the band on the mold plate 118, the band 100 is twisted slightly, and deformed into oblong, elliptical shape, as shown, so as to best position the band in the helmet body during molding for maximum strength reinforcement.

Figures 17, 18, 19:
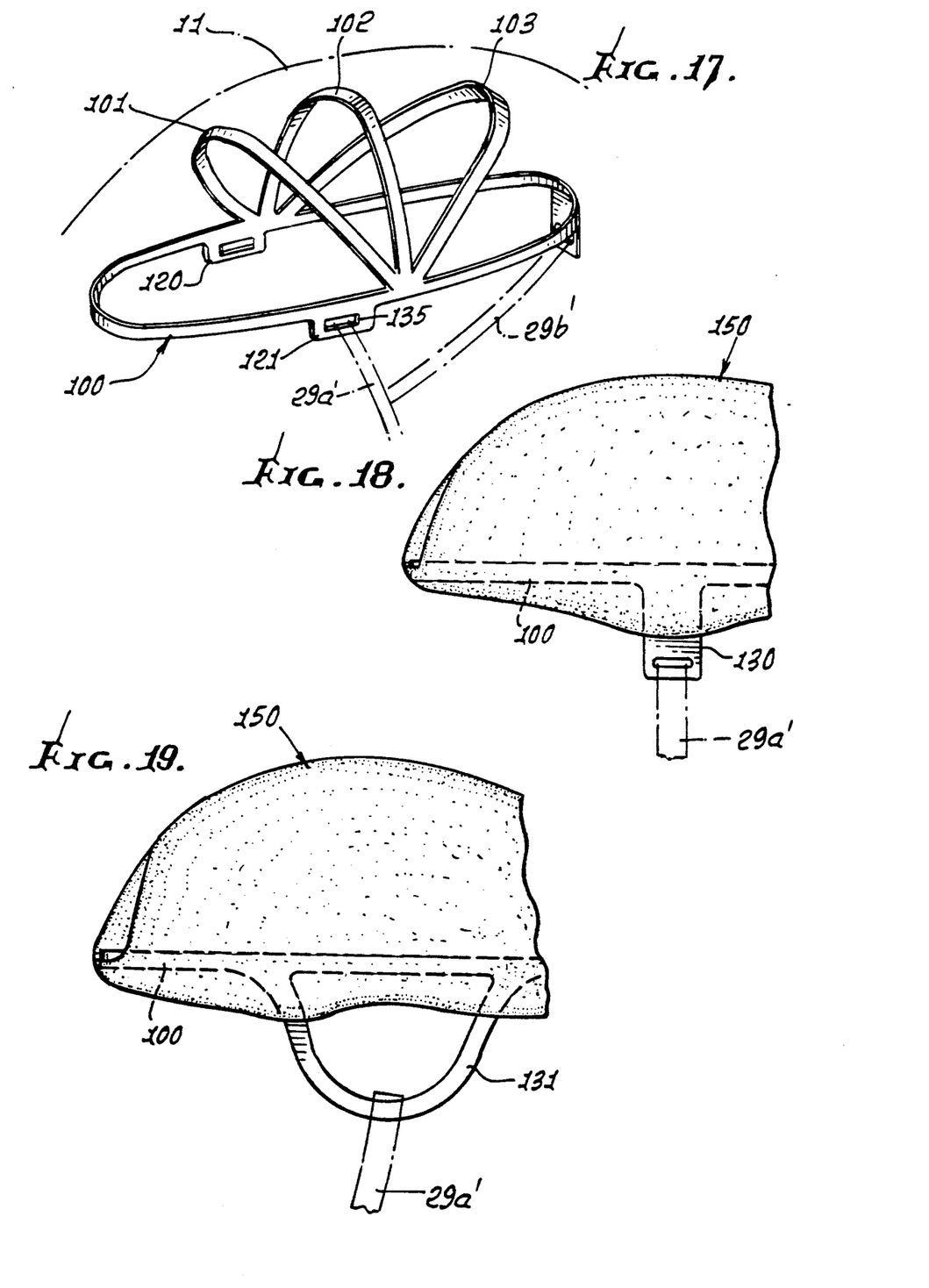
FIG. 17 is a perspective view of a modified reinforcing band group in the form of a harness.
FIGS. 18 and 19 are side views of helmets with further modified reinforcing bands.
Figure 20:
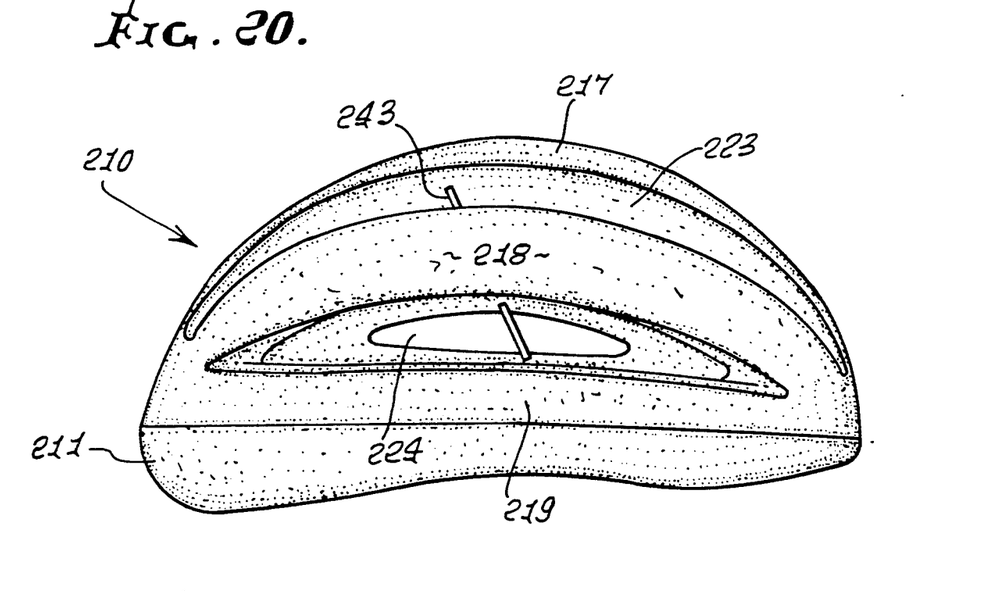
FIG. 20 is a side view of a modified reinforcement helmet.

FIG. 17 shows the provision of at least one, and preferably several additional band-shaped reinforcing members 101–103 which are elongated to extend within i.e. encapsulated in, the helmet body of FIGS. 1 and 2, and/or 11, with arching extent between opposite sides of the helmet. The ends of the bands 101–103 are integral with the band 100 at opposite sides of the helmet body (indicated at 11). Lugs 120 and 121 on the band 100 project downwardly to retain the ends of straps 29a' and 29b', corresponding to straps 29a and 29b, discussed in FIG. 9. The lugs contain openings 135 via which the strap ends may be connected to the lugs.

FIGS. 18 and 19 show variations in which side lugs 130 and 131 are integral with the bands 100, and have different shapes, as shown, to retain strap 29'a.

In FIG. 1, a reinforcement band 100' is like that at 100 in FIG. 11, and is shown embedded in the helmet body to extend above its lower edge.

In FIGS. 20–26, the modified helmet 210 includes a generally dome shaped, foamed plastic body 211 having outer and inner surfaces or sides 212 and 213. Body 211 may consist of air expanded polystyrene. The body 211 has multiple forwardly and rearwardly extending ridge portions 214–219 (see FIG. 22) which are sidewardly spaced apart, as indicated by forwardly and rearwardly extending gaps 220–224. Among other things, the gaps provide large air vent openings for cooling. The ridge portions merge, and the gaps terminate, at reduced size body front wall 225, and at reduced size body rear wall 226. In the example shown, the height of each of walls 225 and 226 at the center line of the helmet defined by plane 227, which bisects the helmet, is less than two-thirds the overall height of the helmet. It is therefore desirable that the helmet ridges or ribs be reinforced against excessive deflection and/or fracturing, as might result from stresses associated with impact. For example, loading imposed as by forces $F_1$ and $F_2$ in FIG. 22 tend to bend ridges or ribs 217 and 218 leftwardly, creating high bending loads at regions 217a and 218a.

In accordance with the invention, an elongated reinforcement member is embedded in the helmet body to extend at a level or levels above its lower edge 230. While the reinforcement member may take various forms, it may, with unusual advantages, include:

i) a looping band section, as for example at 242, embedded in the helmet proximate the helmet lower edge; and ii) at least one additional band section extending upwardly into upper dome-shaped extent of the helmet body. See for example arch-shaped band 243.

Figure 26:
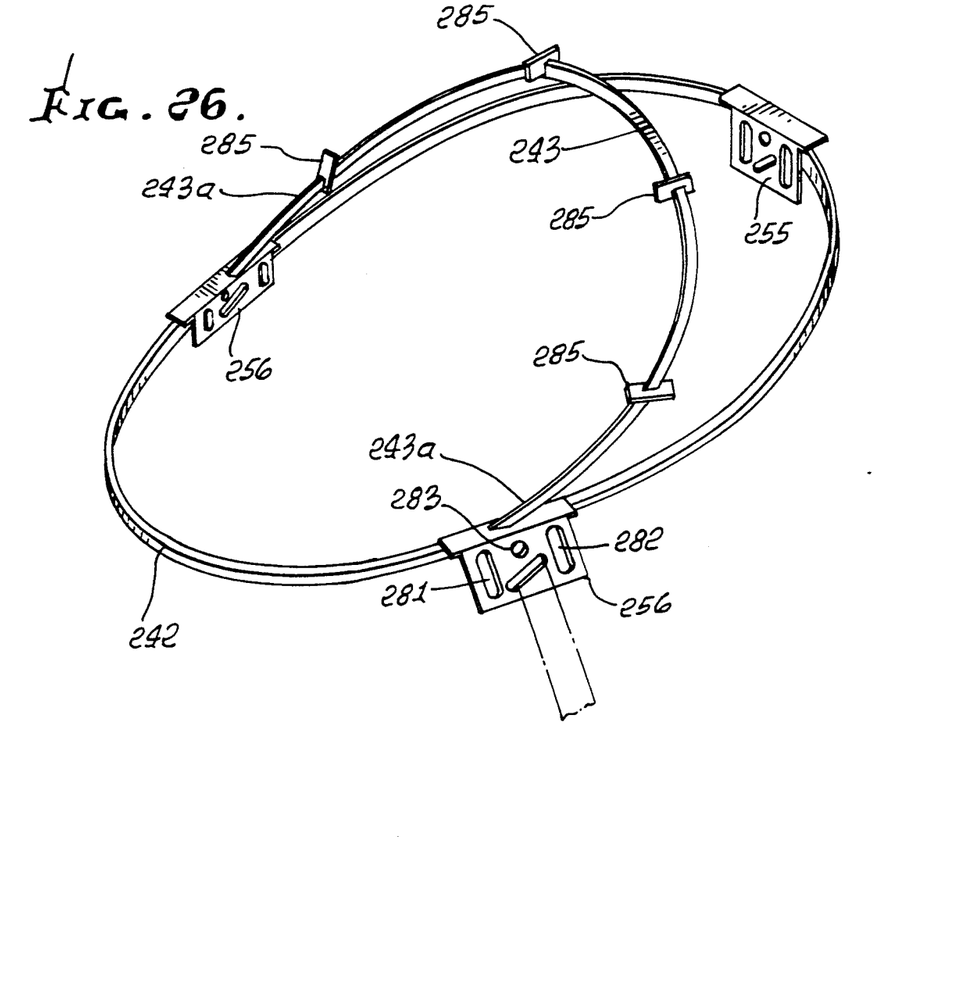
FIG. 26 is a perspective view of reinforcement bands in the helmet of FIGS. 20-25.

As seen in the drawings, the band 243 has lower ends 243a which are anchored to the looping section or band 242, and may, for example, be integrally molded with section 242. Also, arch-shaped band 243 slants upwardly and rearwardly, to transmit impact loading from the ridges 215–218 to band extent 242. Note that the arch-shaped band or section 243 extends laterally through upper portions of those ridges, and across the gaps 220–224. The band section 243 is embedded in the ridges which are molded about the extents (as at 243b) of the band 243 passing laterally crosswise through the ridges.

Figure 26A:
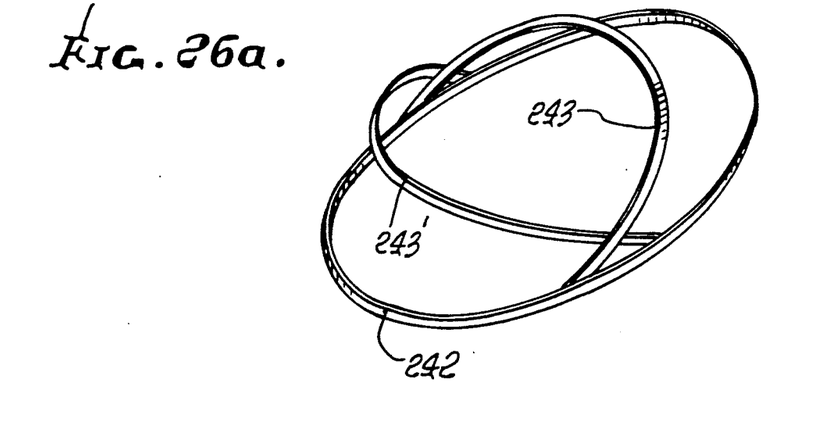
FIG. 26a is a side elevation showing a modification of the FIG. 26 arrangement.
Figure 27:
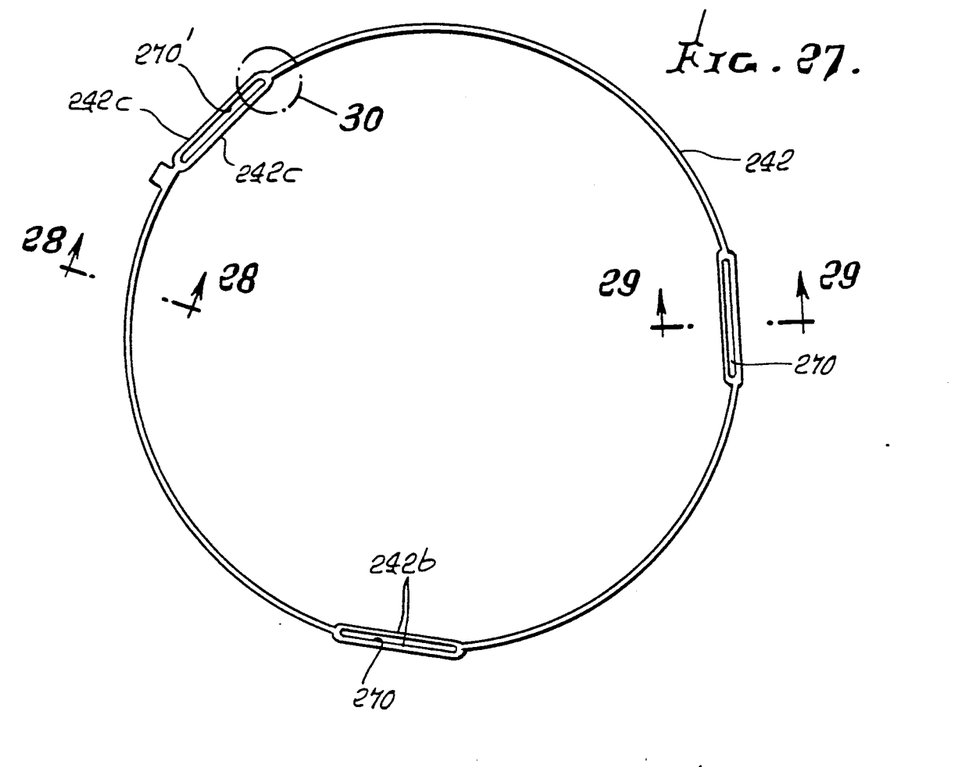
FIG. 27 is a plan view of the lower, looping reinforcement band member depicted in FIG. 26.
Figure 28:
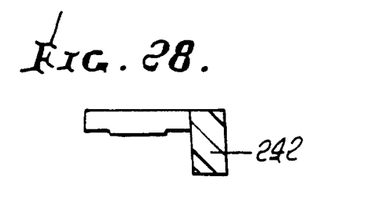
FIGS. 28-30 are sections taken on lines 28—28, 29—29, and 30—30 of FIG. 27.
Figure 29:
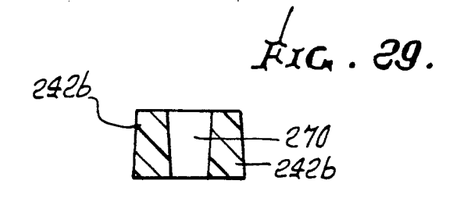
Figure 30:
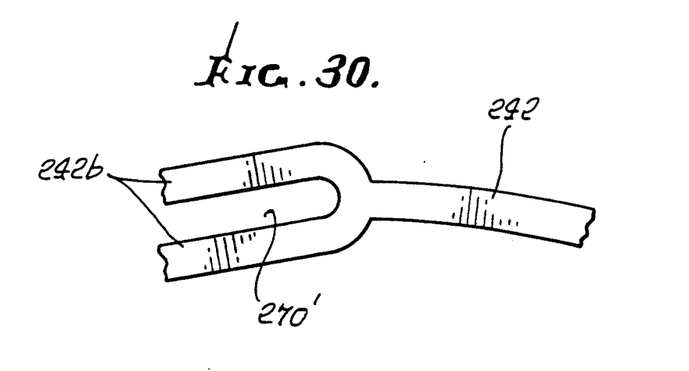

FIG. 26a shows two arching bands 243 and 243', the former the same as in FIG. 26, and the latter 243' also arching upwardly and anchored to band 242, but inclined forwardly and upwardly. Band 243' also extends crosswise through the ridges 215–218, in a manner similar to band 243, but is adapted to add to the impact load resisting strength of the helmet. Using both bands 243 and 243', the helmet body has great resistance to both forward and rearward impact loads that might otherwise tend to fracture the body; however, one such arching band is believed entirely adequate. The reinforcement bands 242, 243 and 243' may consist of high strength synthetic resin such as NYLON, or KEVLAR, or a combination of these, for example.

Figure 22:
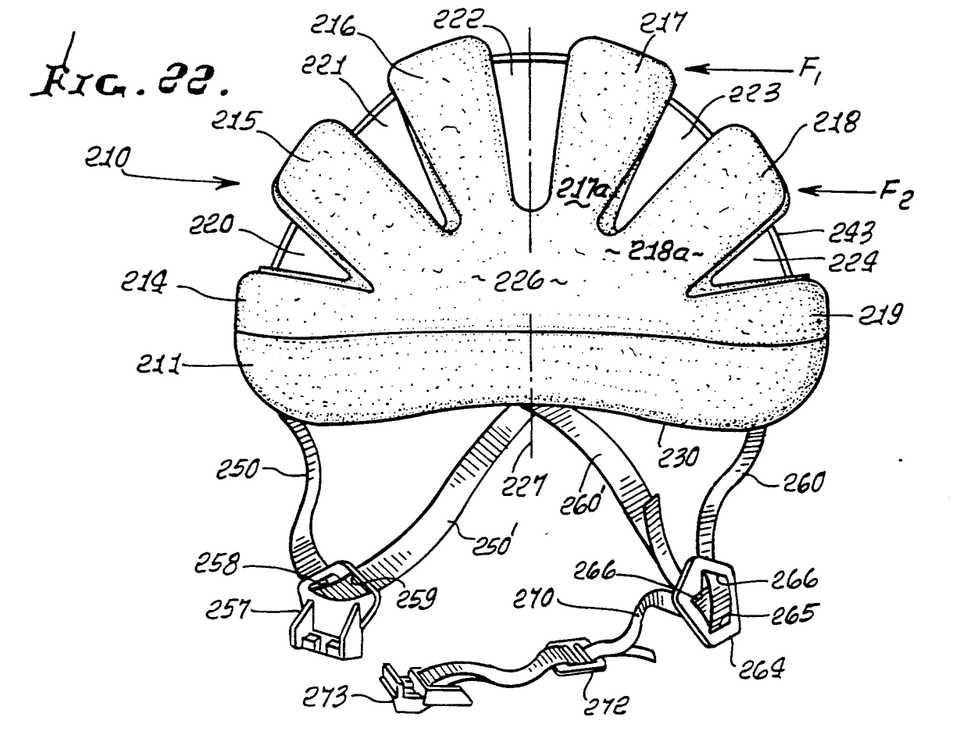
FIG. 22 is a rear end view of the FIG. 20 helmet and also showing retention straps.
Figure 25:
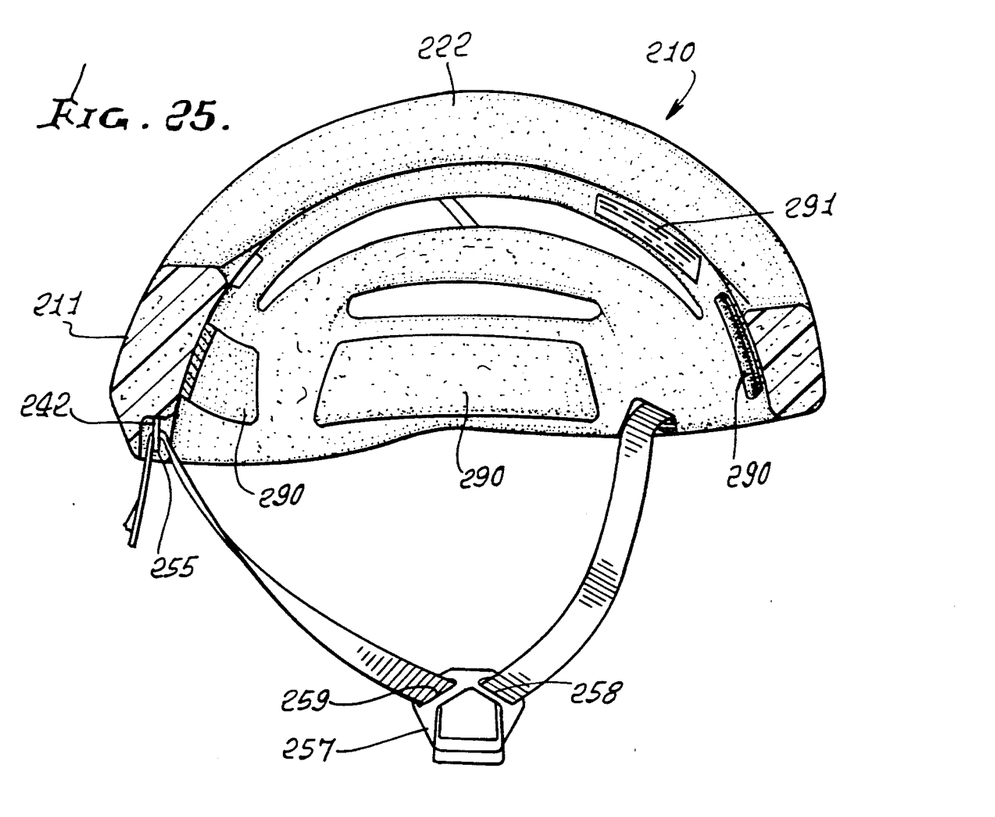
FIG. 25 is a section taken on lines 25—25 of FIG. 24.

FIGS. 22 and 25 also show retention webbing or straps 250-253 attached to the helmet via the looping reinforcement band 242. Left strap or web 250 extends downwardly and forwardly from a rear connection via tab 255 to band 242, and then upwardly at 250' to a forward connection via tab 256 to band 242; and a quick release buckle section 257 has slots 258 and 259 that pass strap 250. Right strap or web 260 extends downwardly and forwardly from similar rear connection at tab 255 to band 242, and then upwardly at 260' to a similar forward connection via a tab 256 to band 242; and an adjustment slider 264 has slots 265 and 266 that pass strap 260. A chin strap 270 extends from retention slots 265 and 267 in slider 264 downwardly to pass through slots formed in a tightening ring 272, then to slots in a quick release buckle handle section 273; then back to pass through slots in ring 272. Section 273 releasably clips to section 257. Accordingly, a very strong three-point anchoring of the webbing to the high strength reinforcement band 242 is provided.

FIG. 26 shows that like plastic tabs 256 are integrally molded to the lower ends of the arching band 243, to in turn anchor-connect to the helmet body, as withen lowermost ridges 214 and 219. The tabs contain through openings 281-283 to pass or receive the material of the helmet body, as the latter is molded. As is clear from FIGS. 27-30, the flat tabs 256 are receivably downwardly into elongated slots 270 formed by the looping section 242. T-heads on the tabs engage the band 242 to limit downward insertion of the tabs into the slots. Tabs 256 spread web loading to widened portions 242b of the band 242. Tabs 256 anchor the band 243 to band 242. Note also the flange-like protrusions 285 integral with the arch-shaped band, and spaced apart or positioned to become firmly embedded in the ridges 215-218 for anchoring the band to the latter during helmet molding.

The rear tab 255 is similarly received in a slot 270' formed by widened portions 242c of band 242. See FIG. 27.

Figure 23:
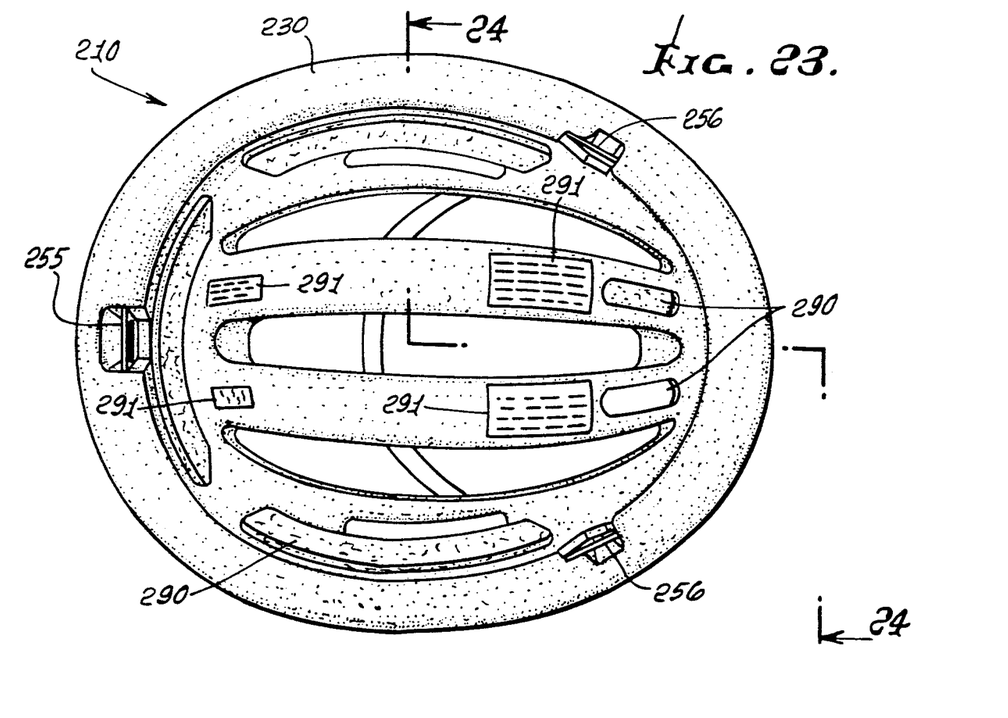
FIG. 23 is a bottom plan view of the FIG. 20 helmet.
Figure 24:
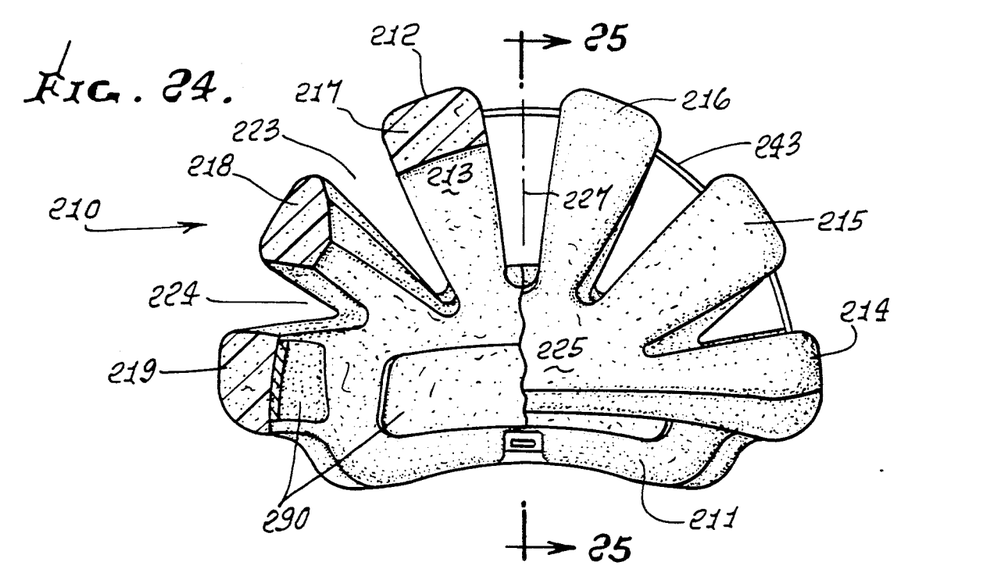
FIG. 24 is a front view of the FIG. 20 helmet taken on lines 24—24 of FIG. 23.

In FIG. 23, pads 290 are bonded to the helmet inner surface; and labels 291 are also provided.

Figure 21:
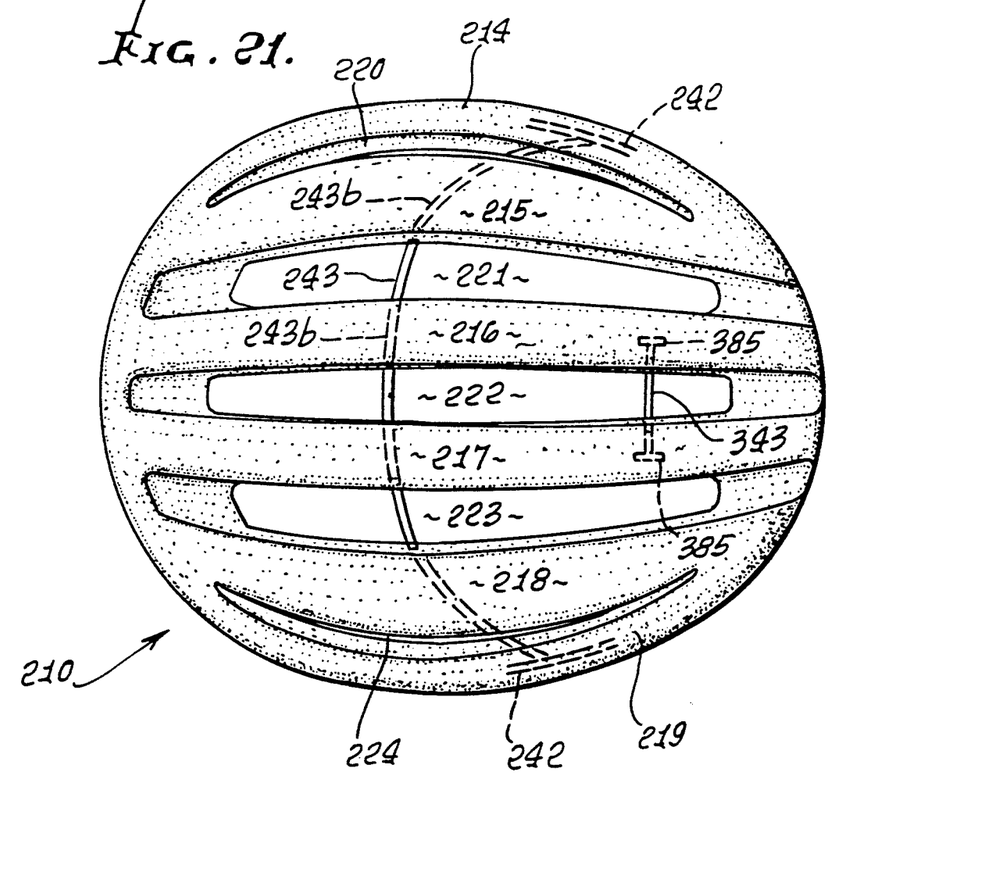
FIG. 21 is a top view of the FIG. 20 helmet.

FIG. 21 also shows an auxiliary strap or web 343, of the same structure as web 243, but extending between and anchored to ribs 216 and 217. Note anchor tabs 385 in the ribs, but integral with web 343. This assists in preventing relative spreading of ribs 216 and 217 under severe loading imposed downwardly upon them.

I claim:

1. In a helmet, the combination comprising:
   a) a helmet body consisting of gas expanded synthetic resin, and having dome shape defining a lower edge extending generally in a loop,
   b) reinforcement means encapsulated in the helmet body to extend above said lower edge, said reinforcement means including
     (i) a looping section comprising at least one discrete elongated reinforcement member encapsulated in the helmet body proximate the lower edge of the helmet body to extend in a loop substantially entirely around said helmet body, through a predetermined, limited height thereof,
     (ii) at least one arch-shaped section extending upwardly of and across the upper dome-shaped extent of the body from one side thereof to the other, each said arched-shaped section comprising at least one discrete elongate reinforcement member encapsulated in the dome-shaped extent of said body through a predetermined, limited arch length thereof.

2. The combination of claim 1 wherein said body has an air vent opening therethrough, a said reinforcement member projecting partly into said opening, edgewise of the member.

3. The combination of claim 1, wherein each said reinforcement member of said looping section has a band shape, each said reinforcement member of said looping section being oriented to have a lower edge projecting towards the lower edge of the helmet body.

4. The combination of claim 3, wherein the looping section is formed from a single reinforcement member in the form of a ring which consists of high strength synthetic resin.

5. The combination of claim 1, including locator means projecting from each reinforcement member of said looping section to locate it in the body of the helmet at the time of molding thereof.

6. The combination of claim 1, wherein each said reinforcement member of each said arched-shaped section is curved to project along the dome-shaped extent defined by the helmet body.

7. The combination of claim 3, wherein each said reinforcement member of each said arched-shaped section has a portion that is embedded in the dome-shaped extent defined by the helmet body.

8. The combination of claim 1 including helmet retention strap means attached to said looping section.

9. The combination of claim 8 wherein said strap means includes multiple strap sections attached to said looping section at selected locations along the length of the looping section.

10. The combination of claim 1 wherein said helmet body has forwardly and rearwardly extending ridge portions which are sidewardly spaced apart, a said arch-shaped section extending into at least two of said ridge portions.

11. The combination of claim 10 wherein a said arched-shaped section extends through at least two of said ridge portions, crosswise thereof.

12. The combination of claim 11 wherein a said arch shaped section is inclined upwardly and rearwardly, relative to the helmet body.

13. The combination of claim 1 wherein there are at least two of said arch-shaped sections which are arch shaped to extend within the helmet body upper dome-shaped extent, said arch-shaped sections having lower ends attached to said looping section.

14. The combination of claim 1 wherein each said reinforcement member consists of one or both of the following:
   i) NYLON
   ii) KEVLAR 15. In the method of constructing a helmet, the steps including:
   a) forming a helmet body consisting of gas expanded synthetic resin, and having dome shape defining a lower edge extending in a loop, b) providing a looping section comprising at least one discrete reinforcement member, and encapsulating each said member in the body, proximate said lower edge of the helmet body to extend in a loop substantially entirely around said helmet body, through a predetermined, limited height thereof, and c) providing at least one arch-shaped section, each said arch-shaped section comprising at least one discrete elongate reinforcement member, and encapsulating each said member in the helmet body to arch across the dome-shaped extent of the helmet body between opposite sides of the helmet body.

16. The method of claim 15, including providing each said member of said looping section to extend substantially parallel to the outer side of the helmet near its lower edge.

17. In the method of constructing a helmet, the steps including:
a) forming a helmet body consisting of gas expanded synthetic resin, and having dome shape defining a lower edge extending in a loop,
b) and embedding a looping section comprising at least one discrete reinforcement member in the body proximate said lower edge of the helmet body to extend a loop substantially entirely around said helmet body, through a predetermined, limited height thereof,
c) and including providing at least one lug on each said member to position it in a mold in which the body is molded.

18. In the method of constructing a helmet, the steps including:
a) forming a helmet body consisting of gas expanded synthetic resin, and having dome shape defining a lower edge extending in a loop,
b) and embedding a looping section comprising at least one discrete reinforcement member in the body proximate said lower edge of the helmet body to extend in a loop substantially entirely around said helmet body, through a predetermined, limited height thereof,
c) and including twisting each said member during molding of the body to position the member in the body during molding thereof.

19. In a helmet, the combination comprising:
a) a helmet body consisting of gas expanded synthetic resin, and having dome shape defining a lower edge extending generally in a loop, and
b) a looping section comprising at least one discrete elongated reinforcement member embedded in the helmet body above said lower edge of the helmet body to extend in a loop substantially entirely around said helmet body, through a predetermined, limited height thereof,
c) each said member having band shape and being oriented to have a lower edge projecting toward the helmet lower edge.

20. In a helmet, the combination comprising:
a) a helmet body consisting of gas expanded synthetic resin, and having dome shape defining a lower edge extending generally in a loop,
b) reinforcement means embedded in the helmet body to extend above said lower edge,
c) said reinforcement means including
(i) a looping section comprising at least one discrete elongated reinforcement member encapsulated in the helmet body proximate the lower edge of the helmet body to extend in a loop substantially entirely around said helmet body, through a predetermined, limited height thereof,
(ii) at least one arch-shaped section extending upwardly of and across the upper dome-shaped extent of the body from one side thereof to the other, each said arch-shaped section comprising at least one discrete elongate reinforcement member encapsulated in the dome-shaped extent of said body through a predetermined, limited arch length thereof,
d) said arch-shaped section having lower ends attached to tabs anchored to said looping section.

21. The combination of claim 20 including an auxiliary web anchored to two laterally spaced ribs defined by the helmet body, and extending therebetween to resist relative spreading of such ribs.

22. In a helmet, the combination comprising:
a) a helmet body consisting of gas expanded synthetic resin, and having dome shape defining a lower edge extending generally in a loop,
b) an elongated reinforcement member embedded in the helmet body to extend above said lower edge,
c) said reinforcement member including
i) a looping section encapsulated in the helmet proximate the helmet lower edge,
ii) at least one additional arch-shaped section extending upwardly into upper dome-shaped extent of the body, and encapsulated therein, and said additional section having lower ends attached to said looping section,
d) and including tabs on said additional section to anchor said section in the helmet body which is molded about said tabs.

23. In a helmet, the combination comprising:
a) a helmet body consisting of gas expanded synthetic resin, and having dome shape defining a lower edge extending generally in a loop,
b) an elongated reinforcement member embedded in the helmet body to extend above said lower edge,
c) said reinforcement member including
i) a looping section encapsulated in the helmet proximate the helmet lower edge,
ii) at least one additional arch-shaped section extending upwardly into upper dome-shaped extent of the body, and encapsulated therein, and said additional section having lower ends attached to said looping section,
d) said helmet body having forwardly and rearwardly extending ridge portions which are sidewardly spaced apart, the additional reinforcement section extending into at least two of said ridge portions,
e) said additional section extending through at least two of said ridge portions, crosswise thereof,
f) said arch-shaped section also extending openly across spaces between said ridge portions.

* * * * *